(12) United States Patent
Sakikawa

(10) Patent No.: US 7,269,948 B2
(45) Date of Patent: Sep. 18, 2007

(54) WORKING VEHICLE COMPRISING A HYDROSTATIC TRANSMISSION

(75) Inventor: Shigenori Sakikawa, Amagasaki (JP)

(73) Assignee: Kanzaki Kokyukoki Mfg. Co., Ltd., Hyogo-Ken (JP)

( * ) Notice: Subject to any disclaimer, the term of this patent is extended or adjusted under 35 U.S.C. 154(b) by 0 days.

(21) Appl. No.: 11/651,151

(22) Filed: Jan. 9, 2007

(65) Prior Publication Data
US 2007/0107422 A1 May 17, 2007

Related U.S. Application Data

(63) Continuation of application No. 11/215,088, filed on Aug. 30, 2005, now Pat. No. 7,171,809.

(30) Foreign Application Priority Data

Sep. 1, 2004 (JP) ............................. 2004-254330
Aug. 2, 2005 (JP) ............................. 2005-223756

(51) Int. Cl.
*B60K 17/00* (2006.01)
*F16H 47/00* (2006.01)
(52) U.S. Cl. .................. 60/487; 180/291; 180/307
(58) Field of Classification Search .............. 60/454, 60/487; 180/291, 307, 374, 376
See application file for complete search history.

(56) References Cited

U.S. PATENT DOCUMENTS 6,250,414 B1 * 6/2001 Sato et al. ................. 180/307
6,637,294 B2 * 10/2003 Nemoto ........................ 60/488
6,722,464 B2 * 4/2004 Nakatani et al. ............. 180/307
6,877,580 B2 * 4/2005 Hasegawa et al. ........... 180/307
6,918,850 B2 * 7/2005 Hasegawa et al. ............. 475/72
6,988,580 B2 * 1/2006 Ohashi et al. ............... 180/307
2002/0139600 A1 10/2002 Nakatani et al.

FOREIGN PATENT DOCUMENTS

| JP | 02-39862 | 10/1990 |
|---|---|---|
| JP | 2001-105913 | 4/2001 |
| JP | 2002-274203 | 9/2002 |
| JP | 2002-283860 | 10/2002 |

* cited by examiner

*Primary Examiner*—Thomas E. Lazo
(74) *Attorney, Agent, or Firm*—Knobbe Martens Olson & Bear LLP

(57) ABSTRACT

A flywheel housing is partitioned by a partition wall disposed at an intermediate position in the lengthwise direction thereof to form a pair of housing portions in which a flywheel is accommodated in one housing portion, and an HST unit that receives power from the flywheel is installed in the other housing portion, the HST unit comprising an oil hydraulic motor, an oil hydraulic pump, an oil hydraulic circuit block containing an oil hydraulic circuit therein and supporting one end of an oil hydraulic motor shaft and one end of an oil hydraulic pump shaft, and a cover housing secured to the oil hydraulic circuit block to cover the oil hydraulic motor and the oil hydraulic pump and support the other end of the oil hydraulic motor shaft and the other end of the oil hydraulic pump shaft; the oil hydraulic circuit block being secured to the flywheel housing.

4 Claims, 13 Drawing Sheets

WORKING VEHICLE COMPRISING A HYDROSTATIC TRANSMISSION

RELATED APPLICATION

This application is a continuation application, and claims the benefit under 35 U.S.C. § 120 of application Ser. No. 11/215,088 filed on Aug. 30, 2005, now U.S. Pat. No. 7,171,809 which is hereby incorporated by reference herein.

BACKGROUND OF THE INVENTION

1. Field of the Invention

The present invention relates to working vehicles comprising an HST (hydrostatic transmission), such as tractors.

2. Description of the Related Art

In such types of working vehicles, the engine's power is generally transmitted through a power transmission system comprising a flywheel, a main clutch, transmission gears, an HST, differential gears, a drive shaft, and so on.

Among such working vehicles, frame type vehicles and frameless type vehicles are known. Frameless type vehicles utilize, as a vehicle body frame, a casing in which constituent elements of the power transmission system are accommodated. Frame type vehicles comprise a transmission case in which constituent elements of the power transmission system are accommodated, the transmission case being secured to the main frame of the vehicle body.

For example, such a flame type vehicle is disclosed in Japanese Examined Utility Model Publication No. 1990-39862. Frameless type vehicles are disclosed in Japanese Unexamined Patent Publication Nos. 2002-283860, 2001-105913, and 2002-274203.

In frameless type vehicles, the casing for accommodating the driving force transmission system is generally divided into a flywheel casing for housing a flywheel and a main clutch, an HST casing for housing transmission gears and an HST, and a differential gear casing for housing differential gears. These casings are connected by bolts or the like.

In frame type vehicles, the oil hydraulic pump shaft and oil hydraulic motor shaft of the HST are each supported at one end thereof by a cover housing of the HST, and at the other end thereof by an oil hydraulic circuit block.

In frameless type vehicles, the oil hydraulic pump shaft and oil hydraulic motor shaft of the HST are each supported at one end thereof by an oil hydraulic circuit block secured to the flywheel casing, and supported at the other end thereof by bearings integrally formed with an HST casing (see, for example, Patent Documents 2 and 3), or supported at both ends thereof by bearings integrally formed with an HST casing. The oil hydraulic circuit block has oil passages formed therein.

Furthermore, in such types of working vehicles, in order to provide a sufficient space for the driver's legs, some drive shafts are often positioned low in the drive transmission system by using transmission gears. With such a configuration, transmission gears are generally disposed at the input or output side of the HST. A casing for housing the transmission gears and HST is generally formed into an enclosed oil chamber so that the transmission gears and HST are hermetically sealed therein and working oil can be held in the sealed space.

However, in frameless type vehicles of the prior art in which the oil hydraulic motor shaft and oil hydraulic pump shaft of the HST are supported by bearings integrally formed with a casing that serves both as a vehicle body frame and a casing, the HST is secured while the shafts are supported by the bearings. Therefore, it is troublesome to install the HST. Furthermore, if the shafts of a precision machinery component such as an HST deviate from the axis of the bearing, it often does not operate well in bench tests after the HST installation. In such a case, the assembled parts must be taken apart and reassembled. It is also troublesome to install the HST in frame type vehicles. In both types of vehicles, noise problems may occur during the operation of the HST.

Furthermore, in the case that an HST and transmission gears for reducing the height of the drive shafts are housed in a hermetically sealed oil chamber, entry of dust from the outside can be prevented, but when working oil held in the sealed oil chamber is contaminated with metal powder and sludge due to the wearing of the transmission gears, operational problems may arise because the HST is a precision instrument.

SUMMARY OF THE INVENTION

Therefore, an object of the invention is to provide a working vehicle in which an HST can be easily installed, the HST having less operating problems after the HST installation, and the vehicle having excellent sound-proofing.

Another object of the invention is to provide a working vehicle structured in such a manner that metal powder and sludge contained in the working oil do not easily enter the HST.

To achieve the above objects, the working vehicle according to the invention comprises a flywheel housing disposed adjacent to an engine and partitioned by a partition wall disposed at an intermediate position in the lengthwise direction thereof to form a pair of housing portions in which a flywheel is accommodated in one housing portion, and an HST unit that receives power from the flywheel is installed in the other housing portion, the HST unit comprising an oil hydraulic motor, an oil hydraulic pump, an oil hydraulic circuit block containing oil hydraulic circuits therein and supporting one end of an oil hydraulic motor shaft and one end of an oil hydraulic pump shaft, and a cover housing secured to the oil hydraulic circuit block to cover the oil hydraulic motor and the oil hydraulic pump and support the other end of the oil hydraulic motor shaft and the other end of the oil hydraulic pump shaft, the oil hydraulic circuit block being secured to the flywheel housing.

The working vehicle according to the present invention comprises a flywheel housing partitioned by a partition wall to form a pair of housing portions wherein a flywheel is accommodated in one housing portion and an HST unit comprising HST components supported by an oil hydraulic circuit block and a cover housing secured thereto is accommodated in the other housing portion, the oil hydraulic circuit block being secured to the flywheel. Therefore, the HST can be assembled by installing an HST unit into said other housing potion of the flywheel housing and securing the oil hydraulic circuit block of the HST unit to the flywheel housing.

Therefore, the installation work during the assembly is easy. Furthermore, by performing a bench test at the stage of assembling the HST unit before installing the HST unit, HST operational problems can be reduced.

Moreover, since the HST unit is covered with a cover housing and an oil hydraulic circuit block and housed in the other housing portion, a soundproofing effect can be provided by the double wall.

The partition wall may be provided with a hollow chamber in which are disposed a bearing for supporting one end of an input shaft that receives power from the flywheel, and a transmission member for drivingly connecting the input shaft with the oil hydraulic pump shaft are disposed; the interior of the hollow chamber being connected to the interior of the HST unit by a narrow oil passage.

In the case that a hollow chamber is formed on the partition wall to accommodate a transmission member such as a gear train therein, a narrow oil passage is provided to connect the hollow chamber and the interior of the HST unit so that working oil leaking into the HST unit flows through the narrow oil passage into the hollow chamber to thereby prevent the entry of metal powder and the like generated from the gear train, etc., in the hollow chamber into the HST unit.

The hollow chamber and the HST unit may be each provided with an overflow oil drain port; an oil storage tank is provided for receiving oil discharged from the overflow oil drain ports; and a charge pump is provided for returning oil from the storage tank to the oil hydraulic circuit in the oil hydraulic circuit block through an oil filter.

To form the narrow oil passage, an annular gap is preferably provided around the circumference of the oil hydraulic pump shaft. It is further preferable that the annular gap have an annular filter attached thereto in contact with the circumference of the oil hydraulic pump shaft.

The narrow oil passage may comprise at least one tubular element that connects the interior of the HST unit with the interior of the hollow chamber.

Alternatively, to form the narrow oil passage, a linear groove may be formed in the portion of the cover housing supporting the oil hydraulic pump shaft.

The above narrow oil passages are preferably formed in such a manner that the amount of oil flowing through the narrow oil passage is less than the amount of oil flowing into the space enclosed by the oil hydraulic circuit block and the cover housing.

DESCRIPTION OF THE PREFERRED EMBODIMENTS

Preferable embodiments of working vehicles of the invention are described below with reference to FIGS. 1 to 14. In all the figures and embodiments, the same constituent components are indicated by the same symbol.

Figure 1:
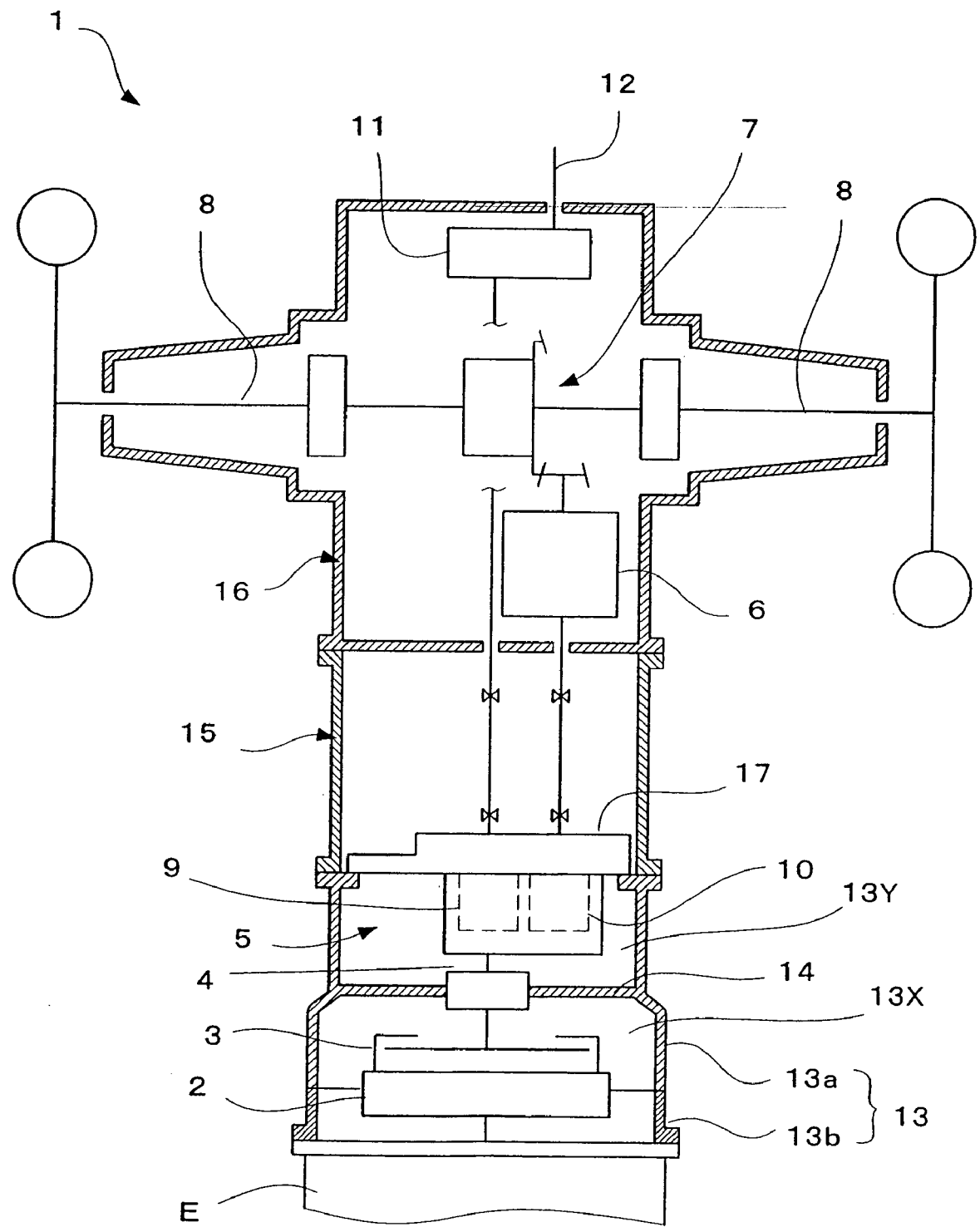
FIG. 1 is a horizontal sectional view of one embodiment of a working vehicle according to the present invention.

FIG. 1 is a horizontal sectional view showing an outline structure of working vehicle 1 according to the invention. FIG. 1 illustrates a frameless type working vehicle. As shown in FIG. 1, the drive force of engine E is transmitted to an axle 8 through a flywheel 2, a main clutch 3, a gear train constituting a transmission member 4 (see FIG. 3), an HST unit 5, a transmission 6, and differential gears 7. The HST unit 5 is provided with an oil hydraulic pump 9 that receives drive force from the transmission member 4, and an oil hydraulic motor 10 that is driven by the oil hydraulic pump 9. The oil hydraulic pump shaft of the oil hydraulic pump 9 is drivingly connected via a PTO (power take-off) mechanism 11 to a PTO shaft 12. The oil hydraulic motor shaft of the oil hydraulic motor 10 is drivingly connected to the transmission 6.

The flywheel 2 and main clutch 3 are accommodated in a flywheel housing 13 that is connected to engine E. According to the embodiment illustrated in FIG. 1, the flywheel housing 13 is formed by connecting two parts, i.e., a main part 13a, and an extension part 13b for length adjustment whose size is selected in accordance with the sizes of the flywheel 2 and main clutch 3; the main part 13a being partitioned by a partition wall 14 disposed at an intermediate position in the lengthwise direction thereof to form a pair of housing portions 13X and 13Y that sandwich the partition wall 14. The flywheel 2 and the main clutch 3 are housed in the housing portion 13X.

The intermediate housing 15 connected to the flywheel housing 13 is sized in accordance with the length of the vehicle body. Drive shafts of the drive force transmission system pass through the intermediate housing 15.

The transmission 6 and differential gear 7 are housed in a differential gear housing 16 connected to the intermediate housing 15. The flywheel housing 13, intermediate housing 15, and differential gear housing 16 are secured to one another by bolts to form a vehicle body frame.

Figure 2:
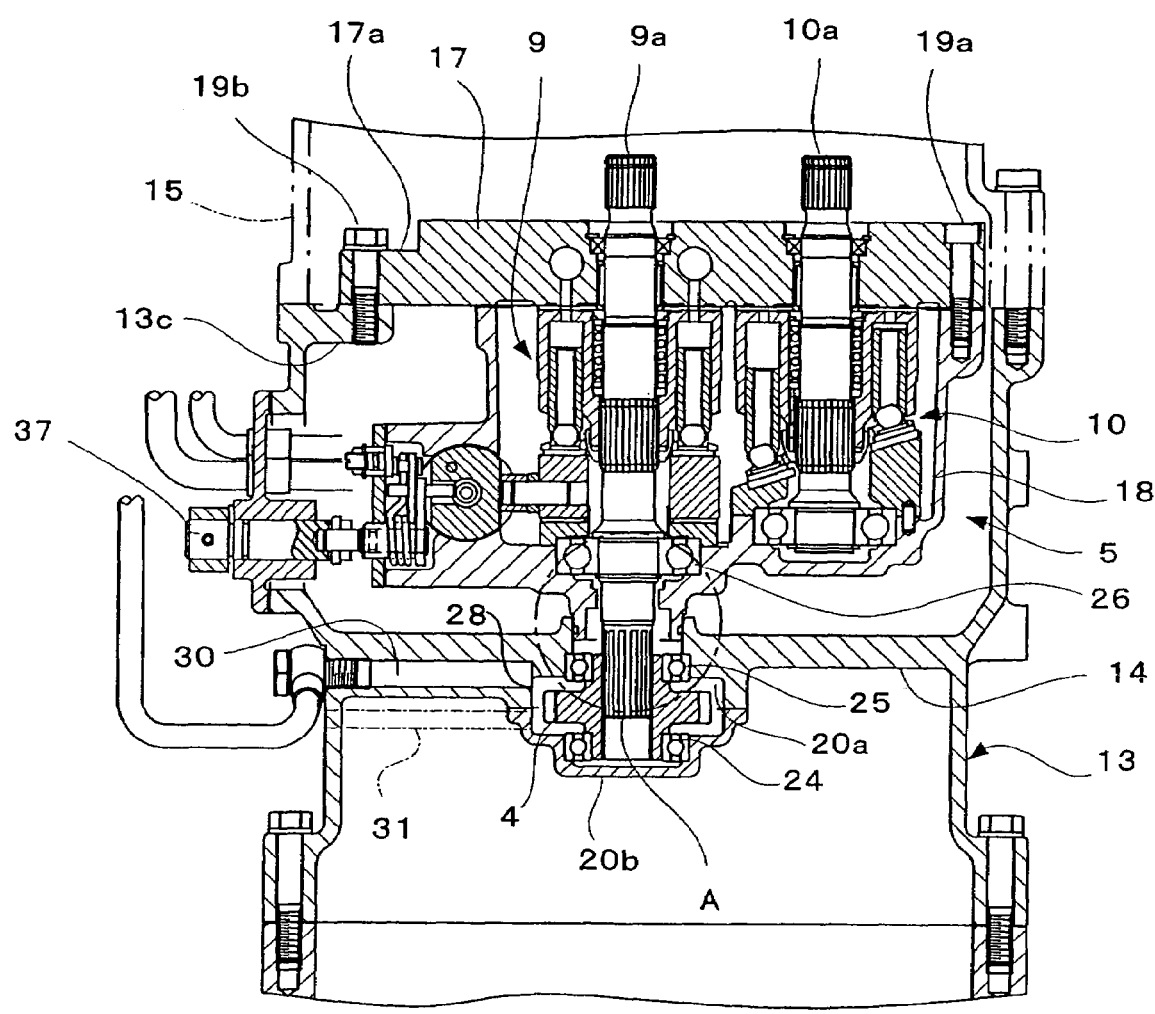
FIG. 2 is an enlarged horizontal sectional view of the HST unit of the working vehicle of FIG. 1.
Figure 3:
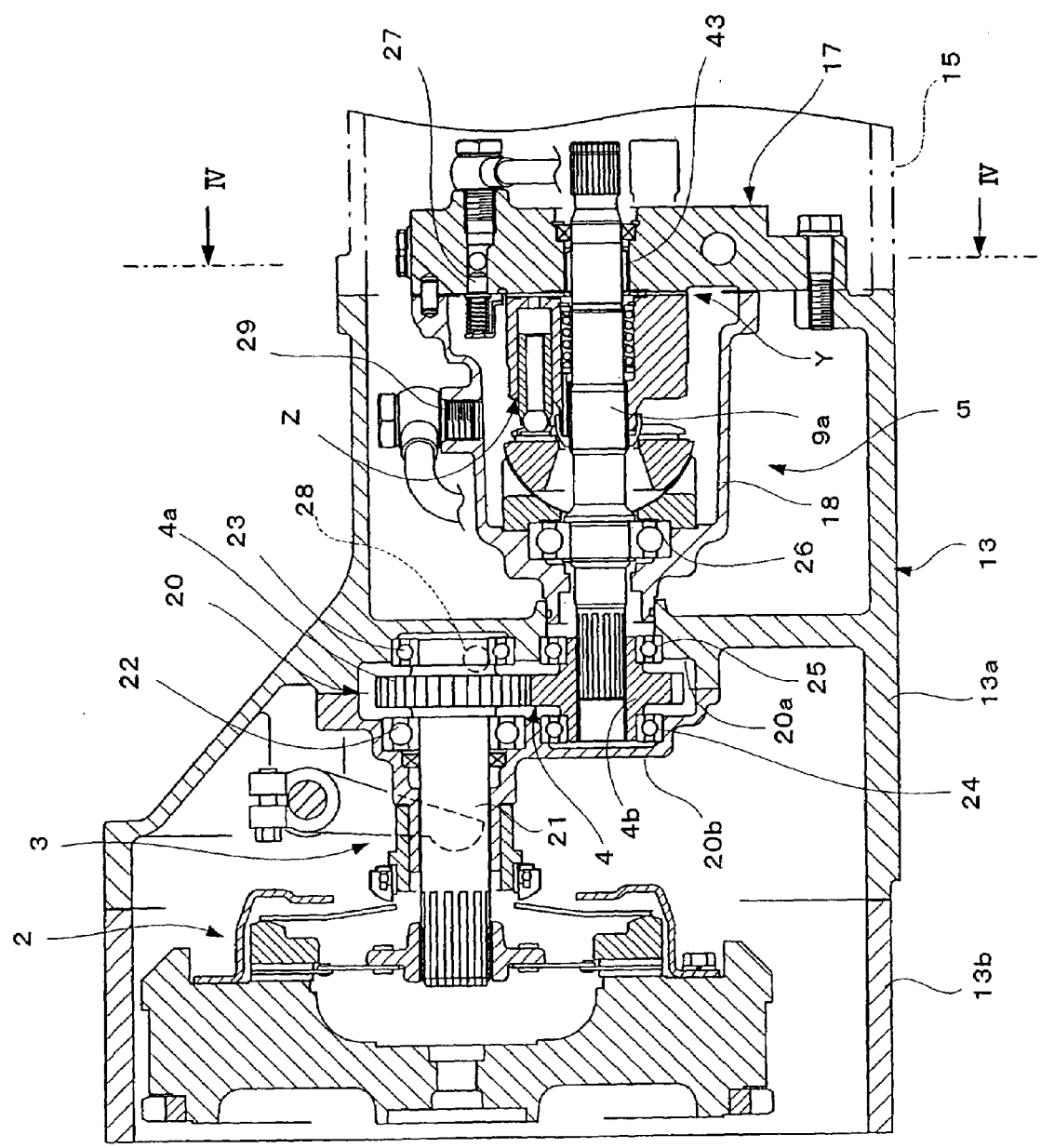
FIG. 3 is an enlarged cross-sectional side view of the HST unit of the working vehicle of FIG. 1.

In the flywheel housing 13, an HST unit 5 is installed in the other housing portion 13Y. As shown in FIG. 2 or 3, the HST unit 5 is provided with an oil hydraulic pump 9 that receives power from a flywheel 2, an oil hydraulic motor 10 that is driven by the oil hydraulic pump 9, an oil hydraulic circuit block 17 that supports one end of an oil hydraulic motor shaft 10a and one end of an oil hydraulic pump shaft 9a, and a cover housing 18 that houses an oil hydraulic motor 10 and an oil hydraulic pump 9 and supports the other end of the oil hydraulic motor shaft 10a and the other end of oil hydraulic pump shaft 9a. The oil hydraulic circuit block 17 contains an oil hydraulic closed circuit which connects the oil hydraulic pump 9 and the oil hydraulic motor 10 via working oil. The cover housing 18 is secured to the oil hydraulic circuit block 17 by a bolt 19a.

Figure 4:
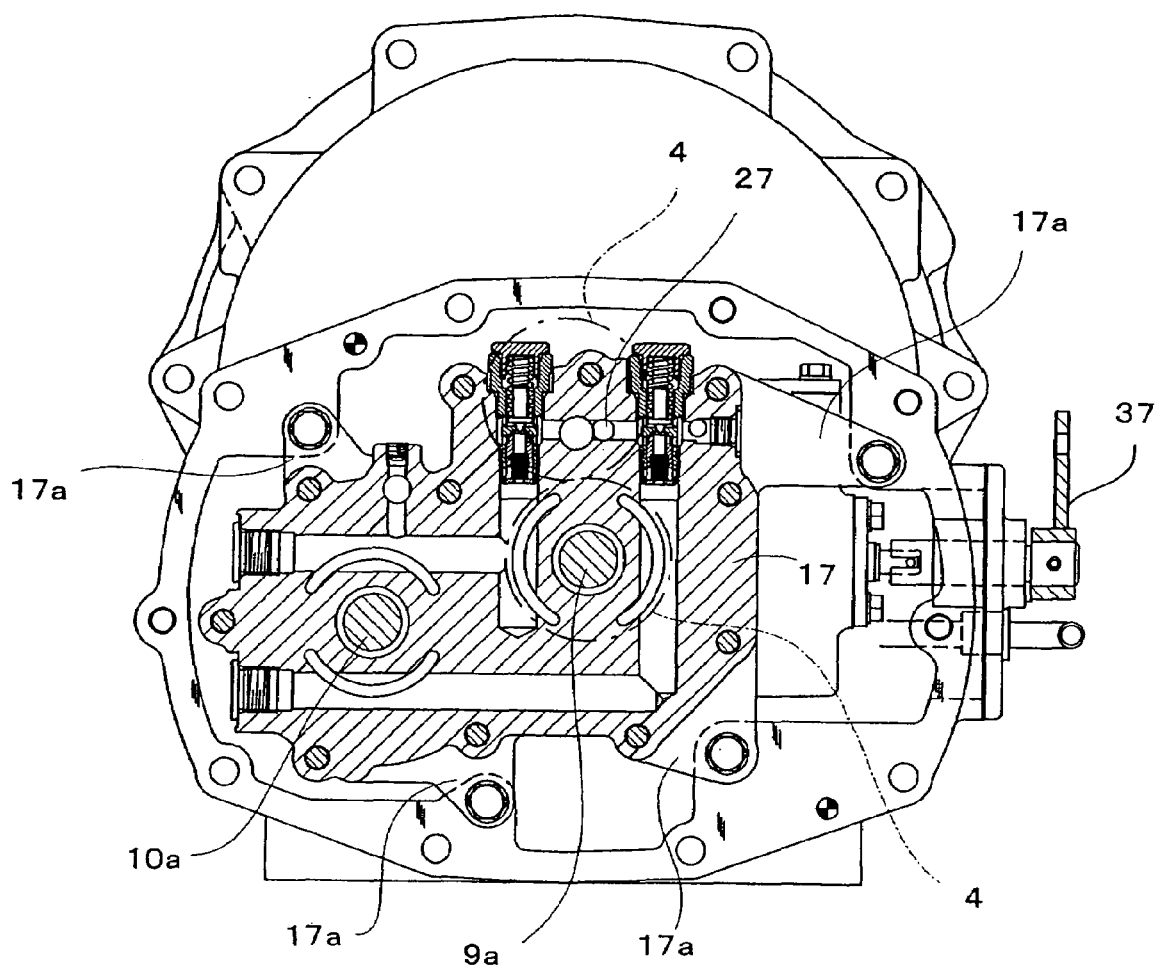
FIG. 4 is a cross-sectional front view taken along line IV-IV of FIG. 3.

As shown in FIGS. 2 to 4, the oil hydraulic circuit block 17 illustrated in Figs is secured by a bolt 19b in such a manner that a flange 17a (see FIG. 4) formed on the oil hydraulic circuit block 17 overlaps a flange 13c formed at the edge of the flywheel housing 13.

As described above, the HST unit 5 is assembled and then secured to the flywheel housing 13 by a bolt 19b. Since the HST unit 5 is already assembled, the securing work is easy.

Moreover, since the HST unit 5 is installed in the flywheel housing 13 after a bench test, operational problems after the installation are less likely to occur.

Furthermore, since the HST unit is doubly covered by the cover housing 18 and the flywheel housing 13, an enhanced soundproofing effect is achieved.

The working vehicle according to the first embodiment is described in further detail as follows.

The partition wall 14 is provided with a hollow chamber 20. The hollow chamber 20 is formed by forming a concave portion 20a in the partition wall 14 and covering the concave portion 20a with a cover 20b having a concave part similar to the concave portion 20a.

The hollow chamber 20 houses bearings 22 and 23 for supporting an input shaft 21 that receives power from a flywheel 2, gear trains 4a and 4b constituting a transmission member 4 drivingly connecting the input shaft 21 and an oil hydraulic pump shaft 9a, and bearings 24 and 25 for rotably supporting the gear 4b that is splined to the oil hydraulic pump shaft 9a disposed below the input shaft 21.

The oil hydraulic pump shaft 9a is supported at one end by a ball bearing 26 in the cover housing 18, and at the other end by a bearing 43 disposed in the oil hydraulic circuit block 17. As shown by the enlarged view in FIG. 5, a narrow annular gap X in which working oil can flow is formed around the circumference of the oil hydraulic pump shaft 9a between the ball bearing 26 and the ball bearings 25. Generally, the plurality of balls inserted in a ball bearing have gaps therebetween and working oil can flow through the gaps. Accordingly, the interior of the hollow chamber 20 and the interior of the HST unit 5 are connected via a narrow oil passage that is formed by the ball bearing 26, annular gap X and ball bearing 25.

The oil hydraulic pump 9 and oil hydraulic motor 10 which constitute the HST are usually in an immersed state in working oil because of working oil leakage from gaps between the constituent components (for example, gaps indicated by symbols Y and Z in FIG. 3) and working oil discharged from a charging relief valve 27 (see FIGS. 3 and 6) into the HST housing chamber.

Since the gear train constituting the transmission member 4 utilizes working oil of the HST as a lubricating oil, part of the gear train is also in an immersed state in the working oil. The hollow chamber 20 and cover housing 18 of the HST unit 5 are provided with overflow oil drain ports 28 (FIG. 2) and 29 (FIG. 3), respectively.

The height relationship between the overflow oil drain port 28 of the hollow chamber 20 and the overflow oil drain port 29 of the cover housing 18 is decided, for example, considering a balance with the resistance of working oil to flow to the transmission member 4, in such a manner that the working oil flows from the HST unit 5 to the hollow chamber 20. Generally, the overflow oil drain port 28 of the hollow chamber 20 is disposed at a position slightly lower than the overflow oil drain port 29 of the cover housing 18.

The narrow oil passage gives flow resistance against the oil flow that leaks into the HST unit 5 and flow to the hollow chamber 20. Therefore, working oil that has leaked and working oil that has been discharged from the charge relief valve 27 into the HST housing chamber are preferentially discharged from the overflow oil drain port 29 of the HST unit 5, and only a small amount of working oil that has passed through the narrow oil passage is discharged from the overflow oil drain port 28 of the hollow chamber 20.

In the embodiment shown in FIG. 2, the overflow oil drain port 28 of the hollow chamber 20 is connected to a drain pipe 30 formed by a long hole drilled in the partition wall 14. Alternatively, a pipe 31 provided outside the partition wall 14 may be used as a drain pipe (see alternate long and short dashed lines in FIG. 2).

Figure 6:
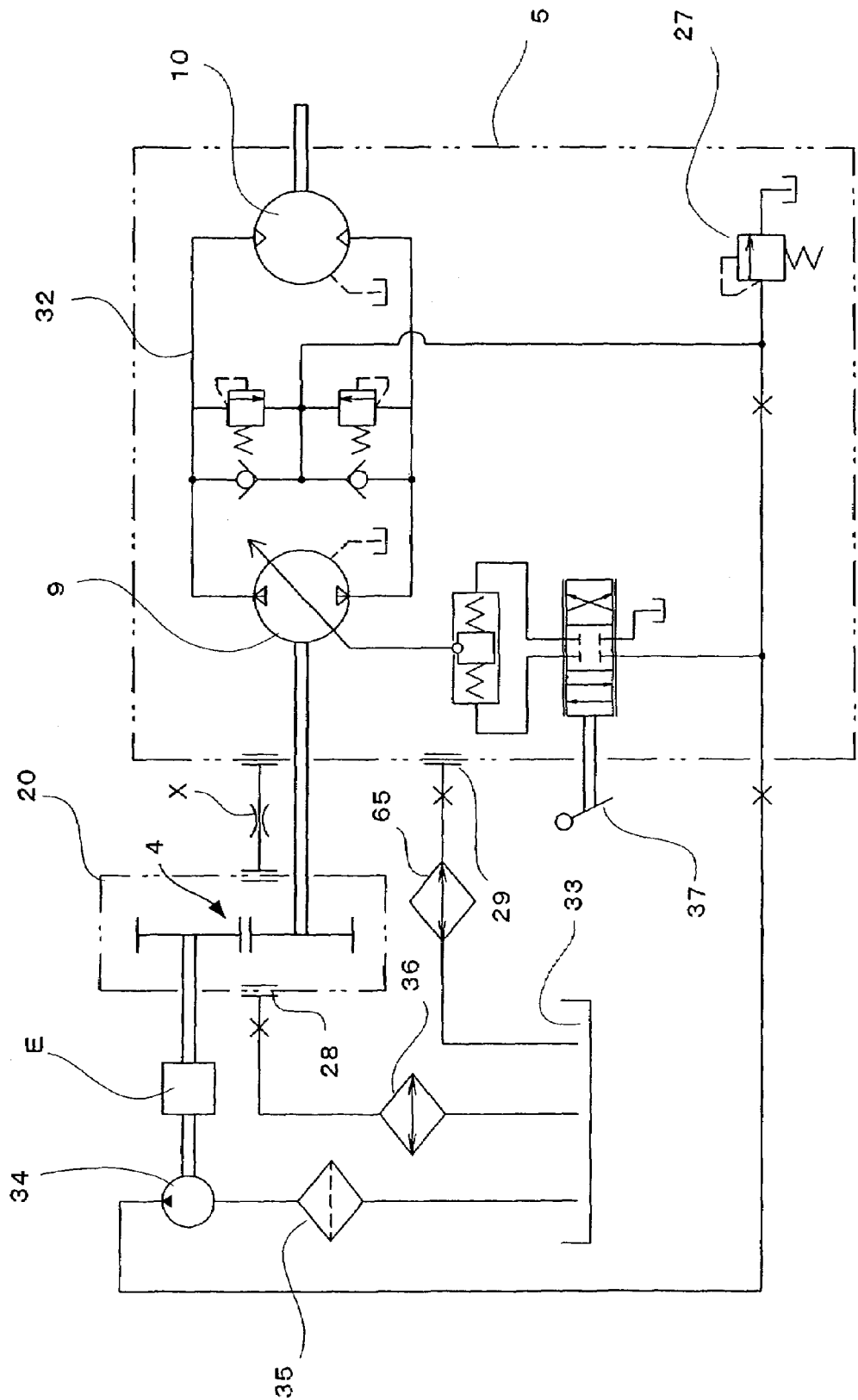
FIG. 6 is an oil hydraulic circuit diagram of the working vehicle of FIG. 1.

FIG. 6 shows an oil hydraulic circuit diagram for operating the HST according to the first embodiment. FIG. 6 illustrates a transmission member 4, an oil hydraulic pump 9, an oil hydraulic motor 10, an oil hydraulic closed circuit 32 for connecting the oil hydraulic pump 9 and the oil hydraulic motor 10, overflow oil drain ports 28 and 29, an oil storage tank 33, a charge pump 34, and an oil filter 35.

As shown in the oil hydraulic circuit diagram of FIG. 6, working oil discharged from the overflow oil discharge ports 28 and 29 is stored in the oil storage tank 33 and filtered through the oil filter 35, and is then returned to the oil hydraulic closed circuit 32 of the HST by the charge pump 34.

In FIG. 6, the charge pump 34 is driven by engine E, and drain oil overflowing from the hollow chamber 20 is discharged via an oil cooler 36 into the oil storage tank 33. The oil hydraulic pump 9 is a variable capacity pump. Reference number 37 indicates the control lever of a pump swash plate, reference number 27 indicates a charge relief valve, and reference number 65 indicates an oil cooler which optionally may be provided in the pipeline connecting the overflow drain oil port 29 and the oil storage tank 33.

Figure 7:
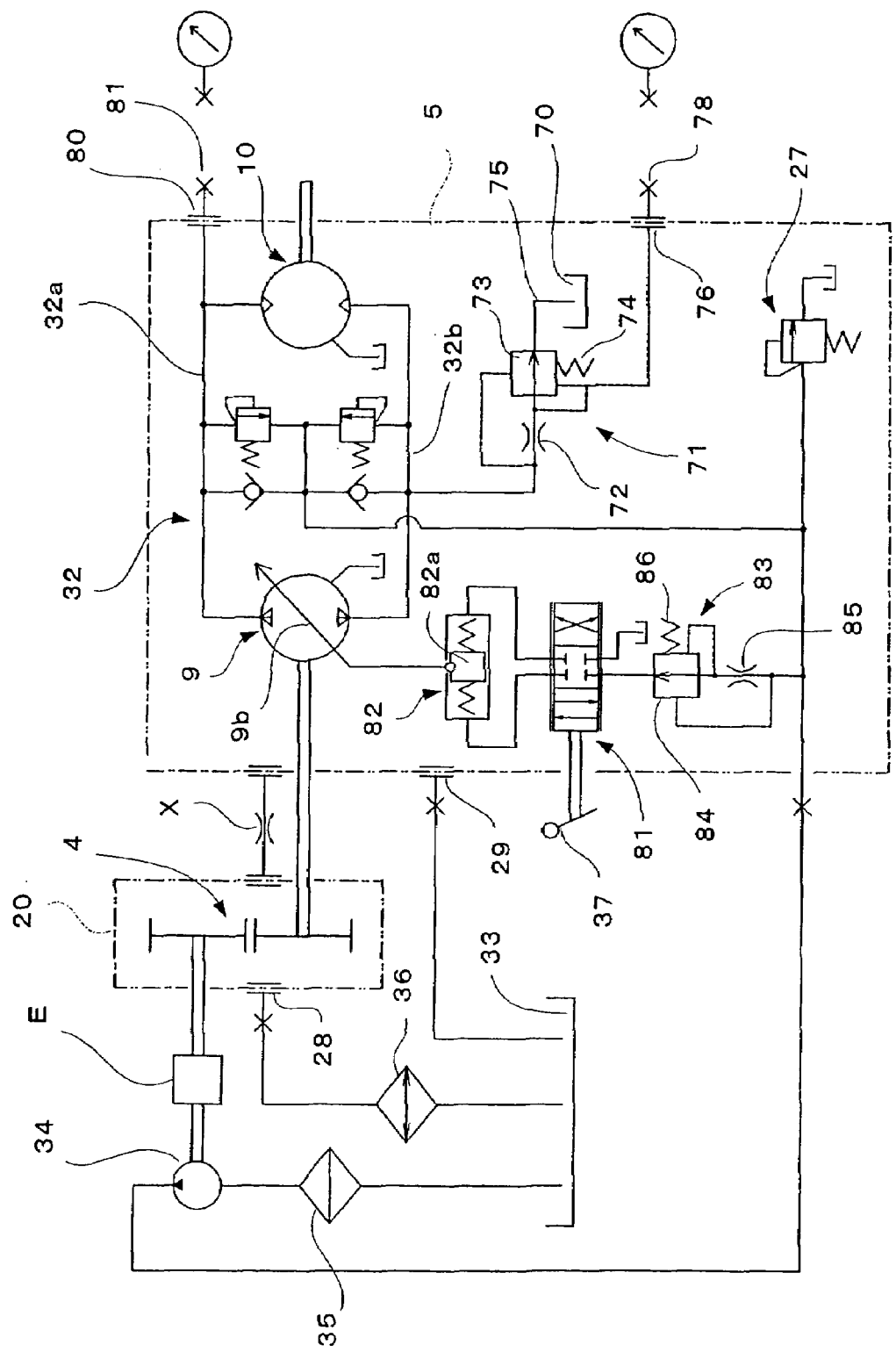
FIG. 7 is a oil hydraulic circuit diagram showing a modification of the circuit of FIG. 6.

FIG. 7 is an oil hydraulic circuit diagram showing a modification of the circuit of FIG. 6. In the oil hydraulic circuit of FIG. 7, an oil hydraulic closed circuit 32 of the HST comprises an oil passage 32a having a high pressure during forward movement and an oil passage 32b having a low pressure during forward movement. A flow regulating valve 71 through which a specific amount of working oil is discharged to a drain tank 70 so as to extend the width of neutral zone is provided in the oil passage 32b having a low pressure during forward movement. The oil passage 32b having a low pressure during forward movement becomes a high-pressure passage during backward movement.

The flow regulating valve 71 is provided with a fixed flow restrictor 72 and a relief valve 73. The relief valve 73 is subjected to a pressure differential between the primary pressure and secondary pressure of the restrictor 72 and additionally forced by an adjustment spring 74 disposed on the secondary side so that the port of the relief valve 73 is usually open to an oil passage 75 connected to the drain tank 70. The secondary oil passage of the fixed flow restrictor 72 connects to a pressure measurement port 76 which is closed by a plug 78.

Figure 8:
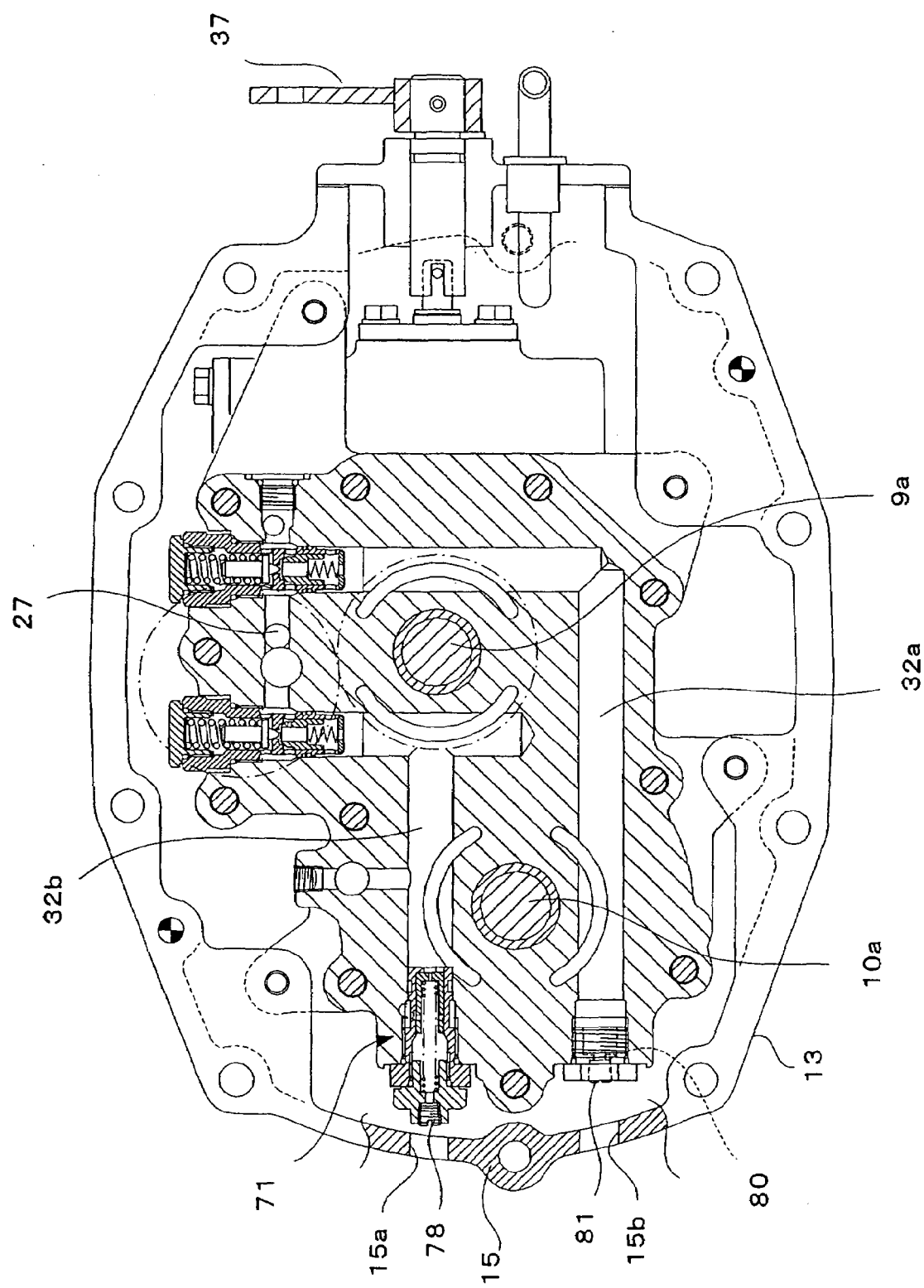
FIG. 8 is a cross-sectional front view of a circuit block comprising the oil hydraulic circuit of FIG. 7.
Figure 9:
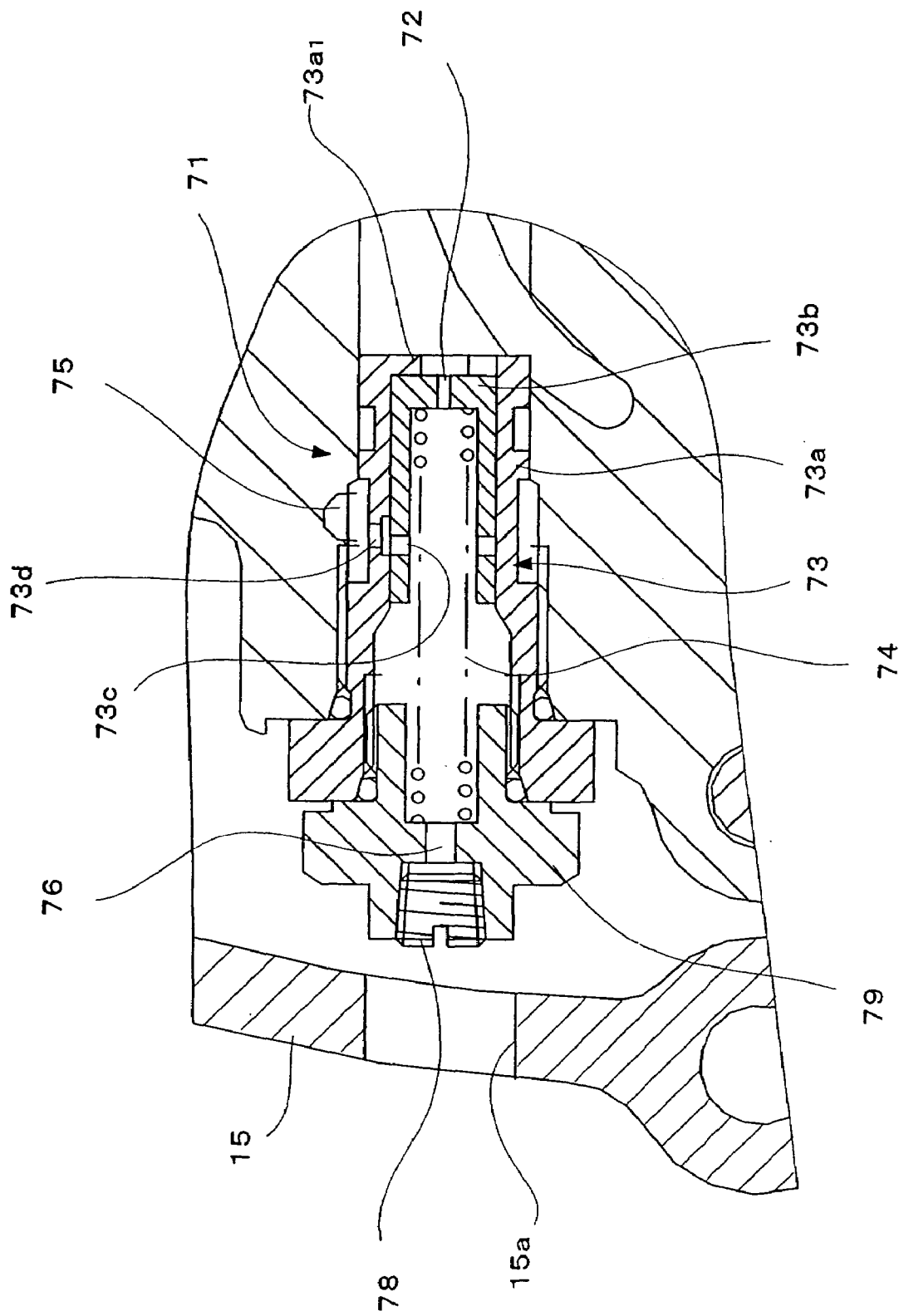
FIG. 9 is an enlarged cross-sectional front view of a part of FIG. 8.

FIG. 8 is a cross-sectional view of an HST hydraulic block having the above circuit configuration. FIG. 9 is an enlarged cross-sectional view of the flow regulating valve 71, which is a part of the hydraulic block.

The relief valve 73 comprises a sleeve 73a screwed into an oil passage 32b having a high pressure during backward movement, and a valve body 73b which is slidably accommodated in the sleeve 73a. The valve body 73b is cylindrical with a bottom surface and provided with a fixed flow restrictor 72 at the bottom, with one end of the adjustment spring 74 being accommodated inside. The adjustment spring 74 is in contact with the bottom surface of the valve body 73b to press the valve body 73b against an end stopper $73a_1$. Ports 73c and 73d communicating with an oil drain passage 75 are provided in the cylindrical walls of the valve body 73b and sleeve 73a, respectively.

A pressure measurement port 76 is provided in a cap 79 for closing the sleeve 73a and is usually closed by a plug 78. The cap 79 faces the peripheral wall of the intermediate housing 15. By removing the plug 78 through an opening 15a in the housing 15 during pressure testing, the oil pressure in the chamber in which the adjustment spring 74 is accommodated (the secondary pressure of the fixed flow restrictor 72), i.e., the internal pressure of the oil hydraulic closed circuit 32, can be measured from outside the intermediate housing 15 without the need for a massive disassembly of the assembled parts.

A flow regulating valve 71 having the above configuration acts in such a manner that when a pump swash plate 9b of the oil hydraulic pump 9 is tilted from the neutral position to a backward position, high-pressure oil flows through the oil passage 32b having a low pressure during forward movement and simultaneously flows from the fixed flow restrictor 72 to the drain tank 70 whereby a specific amount of oil restricted by the fixed flow restrictor 72 is discharged to the drain tank 70 until the pressure differential between the primary pressure before passing through the fixed flow restrictor 72 and the secondary pressure after passing therethrough has reached the pressure corresponding to the force of the adjustment spring 74, so that the oil hydraulic motor 10 is not driven and the width of neutral dead zone can be extended. The differential pressure increases with an increase of oil flow through the oil passage 32b having a low pressure during forward movement and thereby presses the valve body 73b against the force of the adjustment spring 74, so that the valve body 73b closes the drain passage 75. This therefore prevents the increase of working oil discharged into the oil drain passage and enhances the volumetric efficiency of the HST during backward movement. When the pump swash plate 9b of the oil hydraulic pump 9 is tilted from the neutral position to a forward position, low pressure oil, i.e., oil after flowing through the oil passage 32a having a high pressure during forward movement in the oil hydraulic circuit 32 to drive the oil hydraulic motor 10, flows through the oil passage 32b having a low pressure during forward movement and simultaneously flows through the fixed flow restrictor 72 to the drain tank 70. As a result of this leakage, the amount of oil circulating through the oil hydraulic closed circuit runs short but the shortfall is compensated by charging oil supplied by the charge pump 34.

As with the low-pressure oil passage 32b, the oil passage 32a having a high pressure during forward movement is provided with a pressure measurement port 80 closed by an openable and closable plug 81. The plug 81 is accessible through an opening 15b provided in the intermediate housing 15.

The pump swash plate 9b is hydraulically operated in response to the manipulation of a control lever 37. The control lever 37 is attached to a 4-port, 3-position switch valve 81. By switching the switch valve 81, a charging oil pressure drives an oil hydraulic cylinder 82 containing springs and thereby operates the pump swash plate 9b connected to a piston 82a so as to switch the vehicle speed and forward/backward movement.

The operational mechanism of the pump swash plate utilizing the charging oil pressure is highly responsive because of its operation by high-pressure working oil but also reacts to changes in the charging oil pressure caused by engine revolution changes, which may adversely affect the operating feeling. Therefore, the working oil (charging oil) of the pump swash plate 9b is regulated by a flow regulating valve 83 to achieve a stable oil pressure, irrespective of load fluctuations.

The basic configuration of the flow regulating valve 83 is the same as that of the flow regulating valve 71. The relief valve 84 is subjected to a pressure differential between the primary pressure and secondary pressure of a fixed flow restrictor 85 and is additionally forced by an adjustment spring 86 in such a direction that the port is open. For example, when the amount of charging oil suddenly increases, the primary pressure becomes higher than the secondary pressure. When the differential pressure exceeds the pressure corresponding to the force of the adjustment spring 74, the relief valve 84 is closed by a pilot oil pressure according to the primary pressure. When the differential pressure decreases below the pressure corresponding to the force of the adjustment spring 74 with the lapse of time, the relief valve 84 is pressed back to open the relief valve 84 to provide oil hydraulic pressure to a switch valve 81. By repeating this operation, a steady amount of oil restricted by the fixed flow restrictor 85 can be supplied to the switch valve 81.

Figure 10:
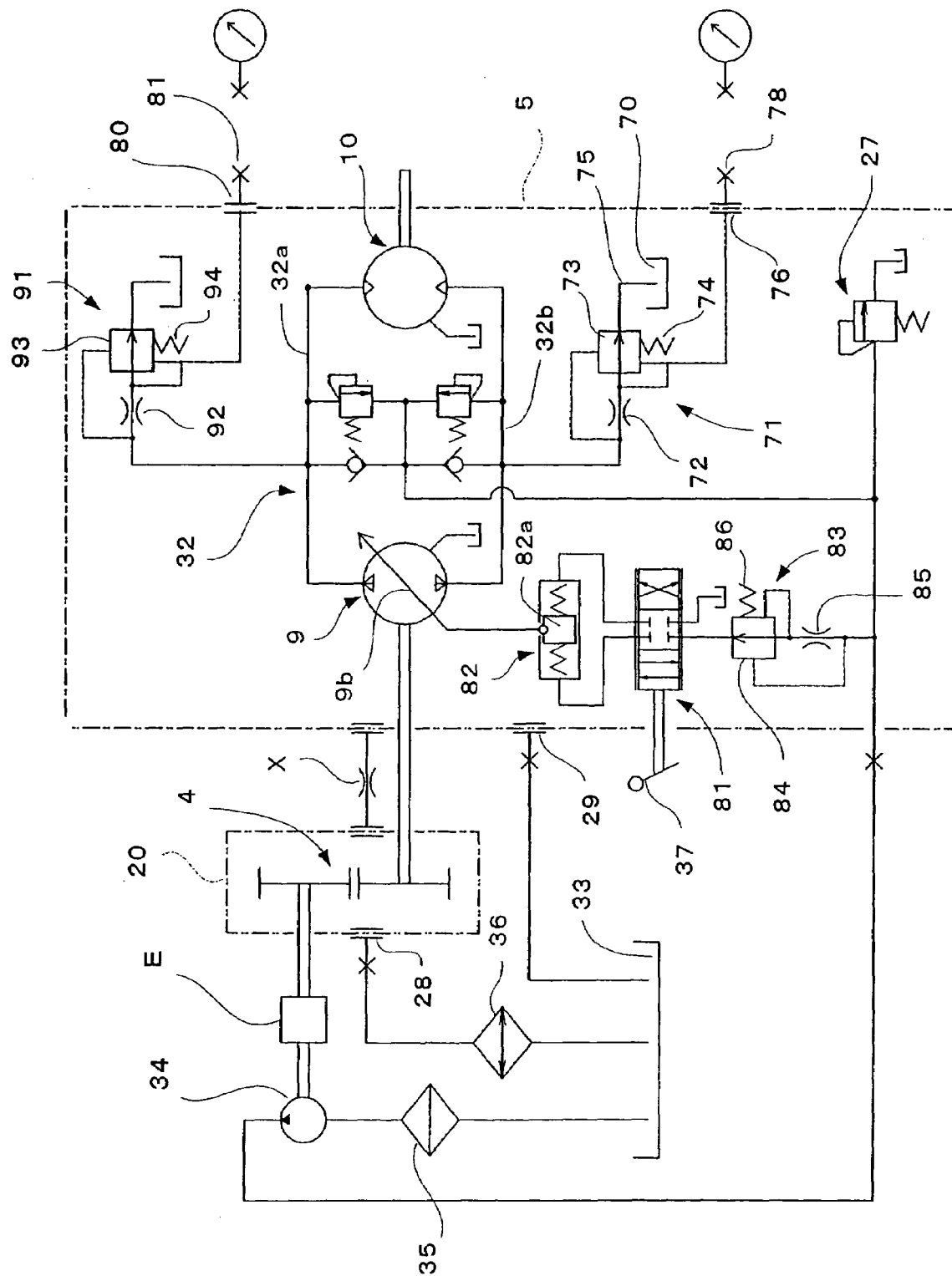
FIG. 10 is an oil hydraulic circuit diagram showing a modification of the oil hydraulic circuit of FIG. 7.

As shown in FIG. 10, each of the oil passages 32a and 32b having a high pressure and a low pressure, respectively, during forward movement may be provided with a flow regulating valve 71, 91. Flow regulating valve 91 has the same structure as the flow regulating valve 71, and is provided with a fixed flow restrictor 92, a relief valve 93, and an adjustment spring 94. The degree of restriction (e.g., cross sectional area of the flow passages) of the fixed flow restrictors 72, 92 defines the extent of the dead zone (i.e., neutral state in which the oil hydraulic motor 10 is not driven). The width of the dead zone is designed to be a certain width required as a characteristic value of the HST. Accordingly, in the oil hydraulic circuit shown in FIG. 10, the degree of restriction of each of the fixed flow restrictors 72, 92 is set to be half the degree of restriction of the fixed flow restrictor 72 in the oil hydraulic circuit of FIG. 7. As a result, compared to the oil hydraulic circuit of FIG. 7, the oil hydraulic circuit of FIG. 10 can achieve an enhanced oil hydraulic operational efficiency, because of a reduction in the amount of oil leakage from the fixed flow restrictors 72, 92, relative to the amount of the low pressure oil flowing through the oil passages 32a and 32b, and reduction in the amount of charging oil supplied by the charge pump 34.

Working oil is poured into the HST unit 5 and flows from the HST unit 5 into the hollow chamber 20. Therefore, metal powder and sludge generated due to wearing of the gear train constituting the transmission member 4 cannot easily reach the interior of the cover housing 18 where the oil hydraulic motor 10 and the oil hydraulic pump 9 are housed, thus reducing the deterioration of the HST.

Figure 5:
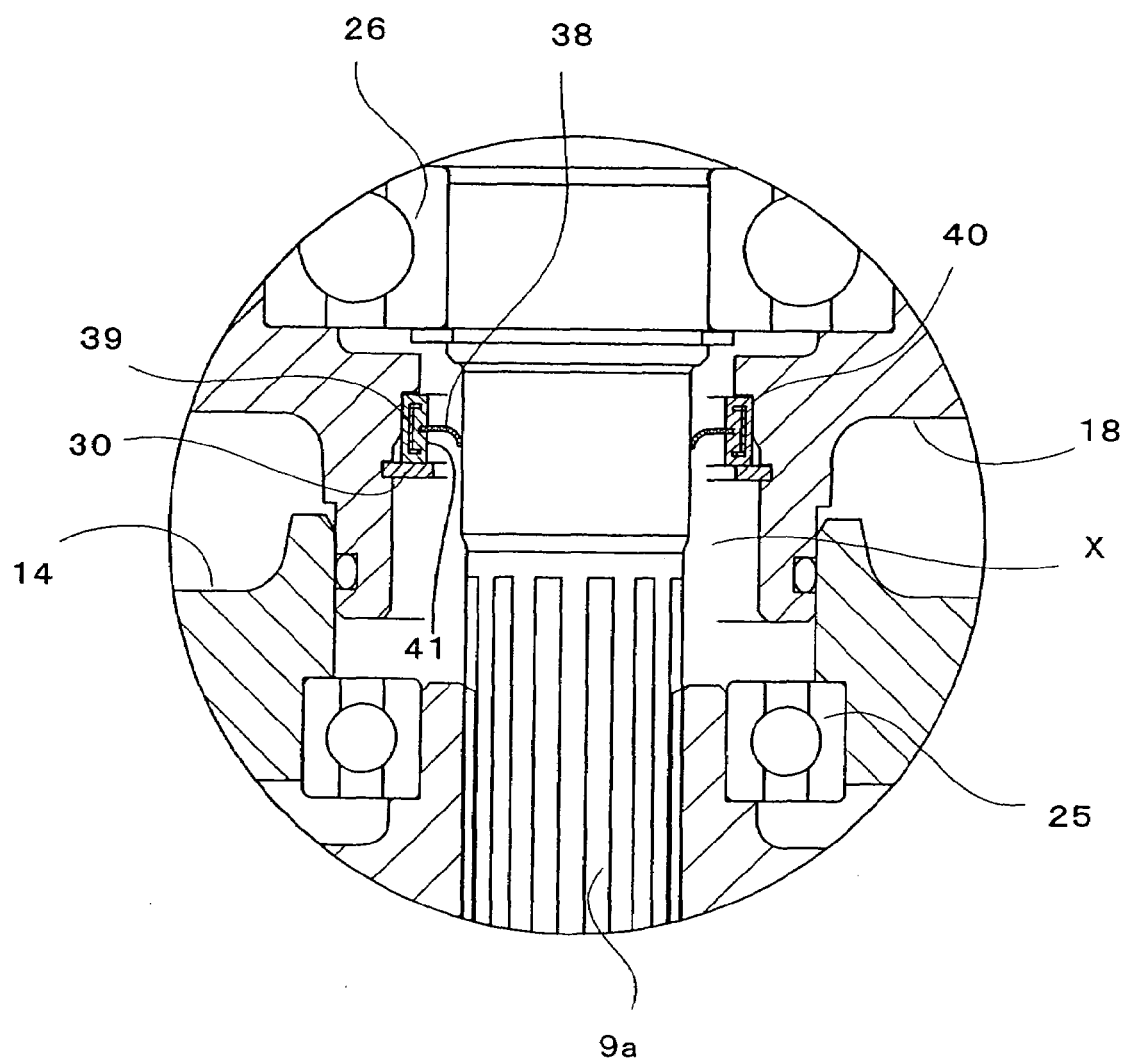
FIG. 5 is an enlarged horizontal sectional view of portion A circled by a dot-dashed line of FIG. 2.

However, when a working vehicle is stopped on a slope with the engine stopped or idling, working oil may flow from the hollow chamber 20 back into the HST unit 5, depending on the direction of the working vehicle. As shown in FIG. 5, it is therefore preferable that an annular oil filter 38 in contact with the circumference of the oil hydraulic motor shaft 10a be provided in the annular gap constituting the narrow oil passage.

The oil filter 38 can be formed using an annular mesh or nonwoven fabric, and can be secured to an annular rubber member 40 having a reinforcing metal ring 39 embedded therein. The annular rubber member 40 is locked by a retaining ring 41. For example, a metallic mesh can be used for the oil filter 38.

As shown in FIG. 5, the annular mesh or nonwoven fabric that forms an oil filter 38 is preferably fitted in such a manner that the annular rubber member 40 having the oil filter 38 attached thereto is fitted onto the oil hydraulic pump shaft 9a from the side of the hollow chamber 20 and angled relative to the oil hydraulic pump shaft 9a so that the inner edge of the oil filter 38 is directed toward the hollow chamber 20 side. With such a configuration, metal powder, etc. generated from the gear train constituting the transmission member 4 are effectively prevented from entering into the HST unit 5.

Figure 11:
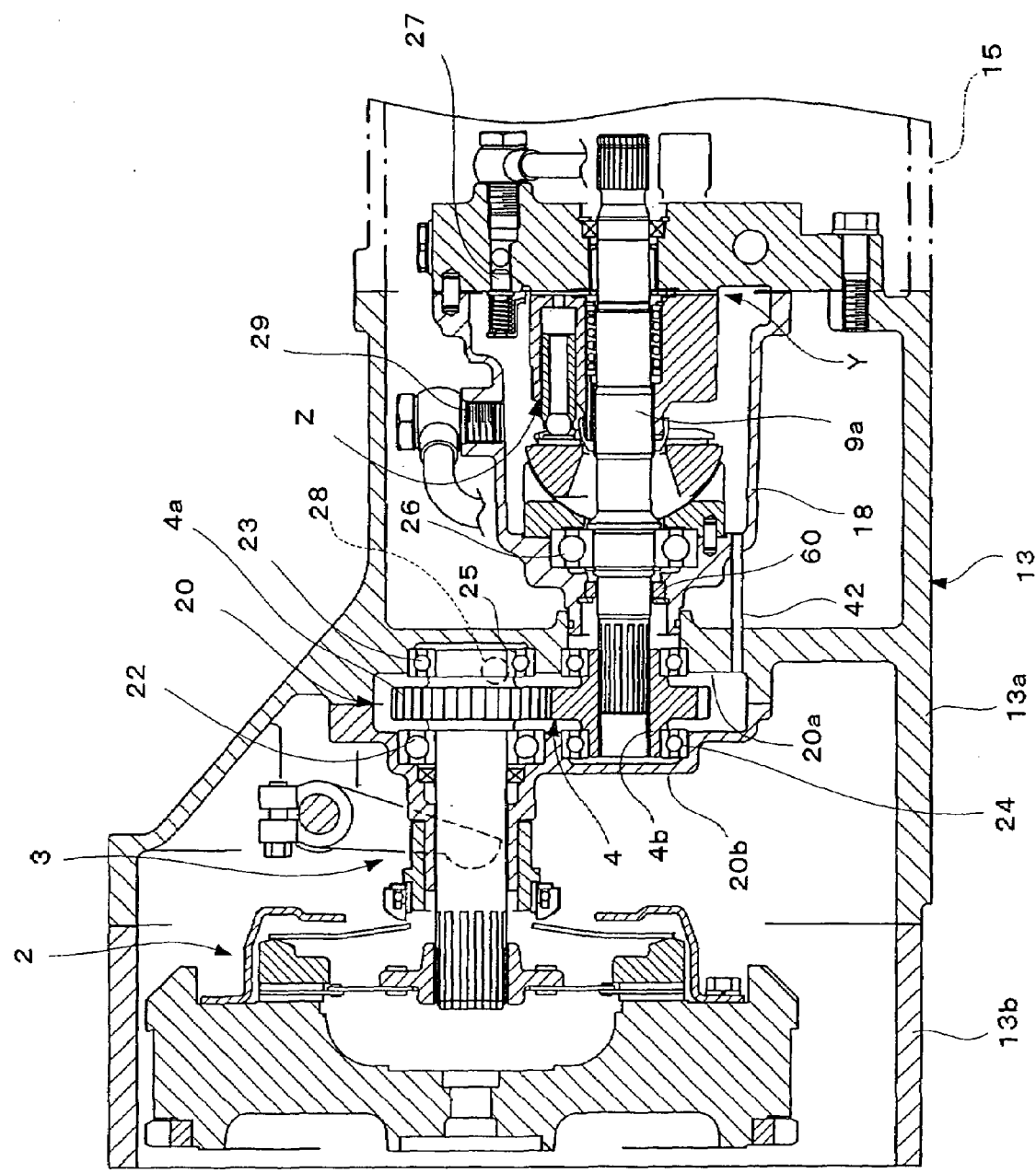
FIG. 11 is an enlarged cross-sectional side view of a modification of the working vehicle of FIG. 1, corresponding to FIG. 3.

According to the first embodiment of the invention, an annular gap X is formed around the circumference of the oil hydraulic pump shaft 9a to form a narrow oil passage. In another embodiment of the invention, as shown in FIG. 11, it is also possible to form a narrow passage by connecting the interior of the HST unit 5 and the interior of the intermediate chamber 20 via a tubular element 42, such as a pipe, while the circumference of the oil hydraulic pump shaft 9a is sealed by a mechanical seal 60. An oil filter (not shown) may be provided in the pipe 42.

Figure 12:
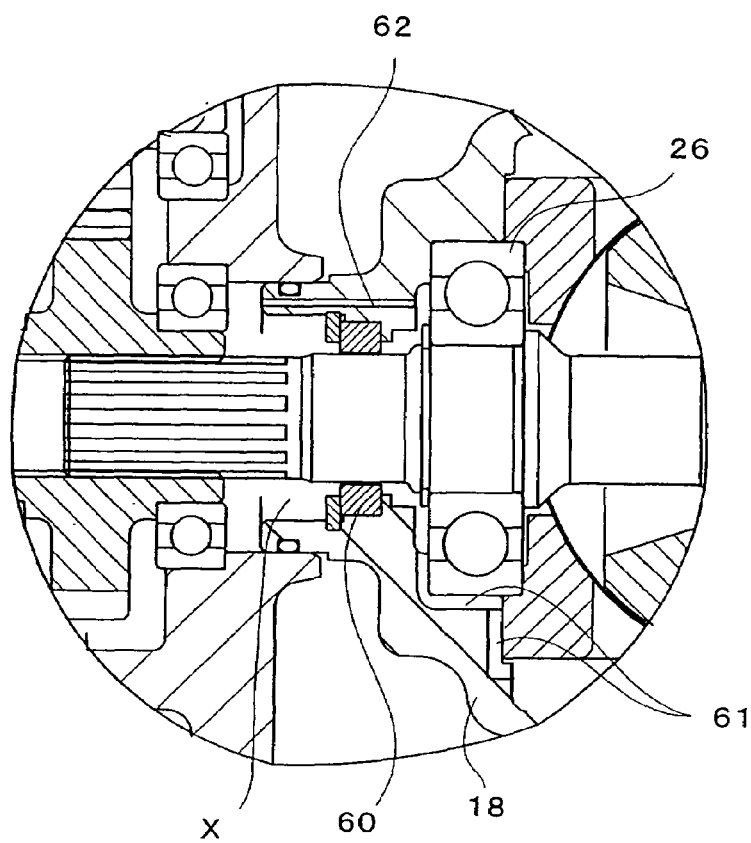
FIG. 12 is an enlarged cross-sectional view of another embodiment of a narrow gap as a constituent component of the invention.
Figure 13:
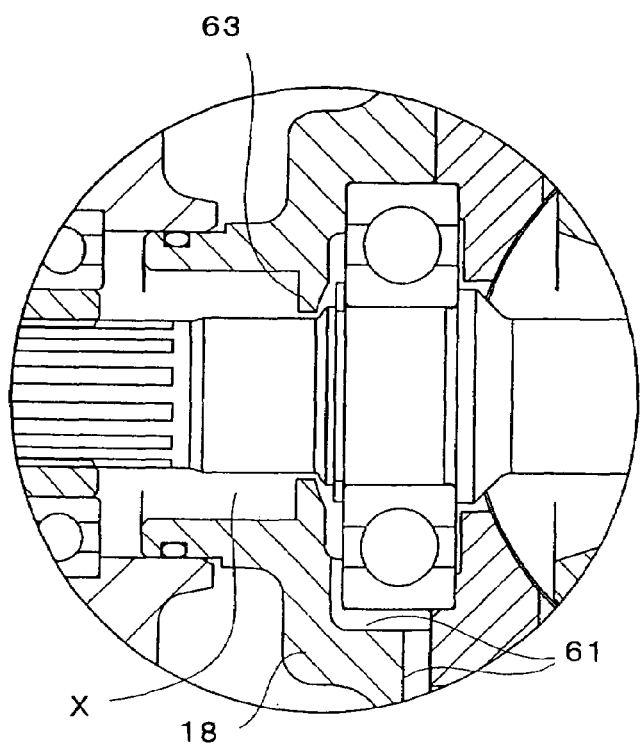
FIG. 13 is an enlarged cross-sectional view of another embodiment of a narrow gap as a constituent component of the invention.

Alternatively, as shown in FIG. 12, a narrow passage may be formed by a groove 61 formed along the ball bearing 26 in the portion of the cover housing 18 that supports the oil hydraulic pump shaft 9a, the groove extending from the interior of the HST unit to the mechanical seal 60, and by tubular element 62, such as an orifice, extending beyond the mechanical seal 60. Alternatively, as shown in FIG. 13, an annular projection 63 for use as a restrictor may be formed on the internal circumference of the bearing of the cover housing 18 without attaching the mechanical seal.

Figure 14:
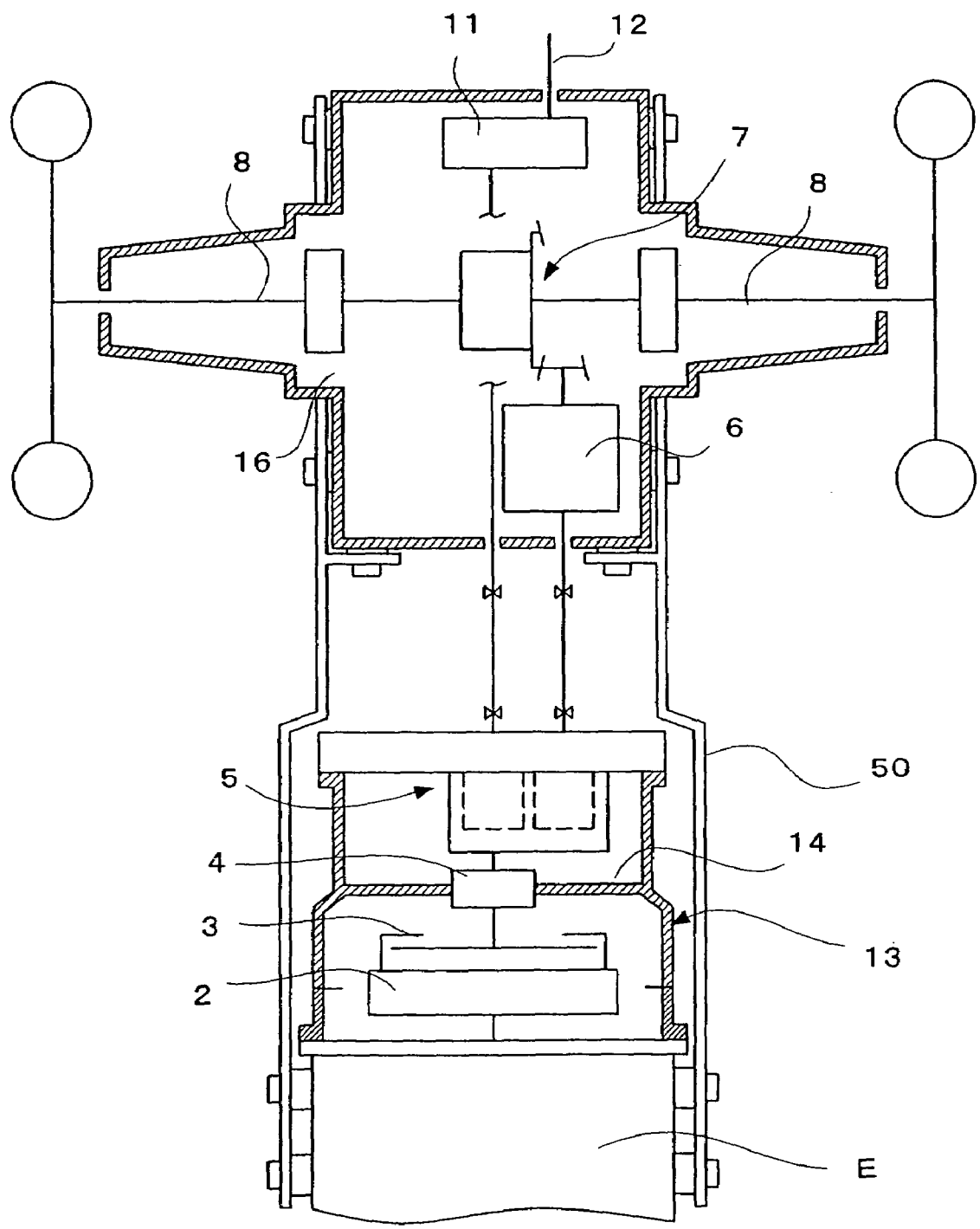
FIG. 14 is a horizontal sectional view of another modification of the working vehicle of FIG. 1.

The working vehicle according to the invention is also applicable to frame type vehicles, as shown in FIG. 14. Such frame type vehicles are structurally the same as in the first embodiment except that a flywheel housing 13 connected to engine E, and a differential gear housing 16 are mounted and secured to a vehicle frame 50.

What is claimed is:

1. A working vehicle comprising:
   an engine;
   a flywheel housing disposed adjacent to the engine;
   an HST unit, being secured to the flywheel housing, comprising an oil hydraulic motor, an oil hydraulic pump, an oil hydraulic circuit block containing oil hydraulic circuits therein and supporting one end of an oil hydraulic motor shaft and one end of an oil hydraulic pump shaft, and a cover housing secured to the oil hydraulic circuit block to cover the oil hydraulic motor and the oil hydraulic pump and support the other end of the oil hydraulic motor shaft and the other end of the oil hydraulic pump shaft; and
   at least one pressure measurement port for measuring oil pressure in an oil hydraulic closed circuit which connects the oil hydraulic pump and the oil hydraulic motor via working oil being provided in the oil hydraulic circuit block.

2. A working vehicle according to claim 1, further comprising:
   a differential gear housing in which a transmission and differential gear are housed; and
   an intermediate housing being connected between the flywheel housing and the differential gear housing;
   wherein the pressure measurement port or each of the pressure measurement ports faces a peripheral wall section of the intermediate housing, and the intermediate housing is provided with an opening for access to the pressure measurement port therethrough.

3. A working vehicle according to claim 2, wherein each of oil passages of the hydraulic closed circuit, having a high pressure and a low pressure respectively during forward movement, is provided with the pressure measurement port, a pair of the pressure measurement ports are arranged adjacent to each other, and a pair of the openings corresponding to each of the pressure measurement ports are arranged adjacent to each other in the same-side wall section of the intermediate housing.

4. A working vehicle according to claim 1, further comprising:
   a differential gear housing in which a transmission and differential gear are housed;
   an intermediate housing being connected between the flywheel housing and the differential gear housing;
   at least one flow regulating valve provided in the oil hydraulic circuit block to drain a regulated amount of oil from the oil hydraulic closed circuit to extend the width of neutral dead zone of the HST wherein the flow regulating valve is provided with the pressure measurement port facing a peripheral wall section of the intermediate housing;
   a detachable plug to close the pressure measurement port; and
   an opening provided in the intermediate housing for access to the pressure measurement port therethrough.

* * * * *